United States Patent

[11] 3,549,186

| [72] | Inventor | Lyle V. Larsen<br>Naperville, Ill. |
|---|---|---|
| [21] | Appl. No. | 831,112 |
| [22] | Filed | June 6, 1969 |
| [45] | Patented | Dec. 22, 1970 |
| [73] | Assignee | Chicago Bridge & Iron Company<br>Oak Brook, Ill.<br>a corporation of Illinois |

[54] QUICK OPENING CLOSURE USING SPLIT SHEAR STUDS
13 Claims, 10 Drawing Figs.

[52] U.S. Cl. .................................................. 292/256.71,
85/1, 220/55
[51] Int. Cl. ....................................................... B65d 45/30,
A47J 36/10, F16b 35/02
[50] Field of Search ............................................. 792/256.71,
256, 256.73; 85/1S; 151/(Inquired); 220/3, 46,
46MS, 55A, 55M

[56] References Cited
UNITED STATES PATENTS

| 1,111,657 | 9/1914 | Kohler............................. | 85/1 |
| 1,400,248 | 12/1921 | Thomas........................... | 85/1 |
| 2,903,152 | 9/1959 | Kuo................................ | 220/46 |
| 3,398,853 | 8/1968 | Jorgensen....................... | 220/55 |

*Primary Examiner*—Marvin A. Champion
*Assistant Examiner*—Edward J. McCarthy
*Attorney*—Merriam, Marshall, Shapiro and Klose ABSTRACT: Quick release fastening means for fastening two adjacent members along a common joint, including a multisection shear stud having at least two separable, longitudinal sections adjacently disposable in abutting relationship to define an interface extending along the length of the stud sections and for insertion along the common joint. The stud is rotatable from: (1) a locking position with the interface transverse to the joint for fastening the members together with shear forces along the stud sections at the common joint; to (2) an unlocked position with the interface substantially aligned with the joint to enable slidable displacement of one stud section with respect to the other for detaching and separating the members. Improved quick release closure means for detachably connecting an end closure plug to a vessel, such as a high pressure vessel, utilizing a plurality of multisection shear studs disposed along the joint between the end plug and the vessel.

PATENTED DEC 22 1970
3,549,186
SHEET 1 OF 2
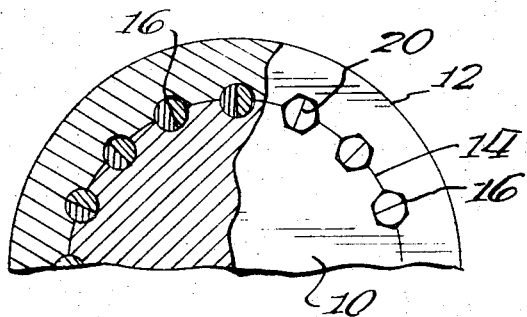
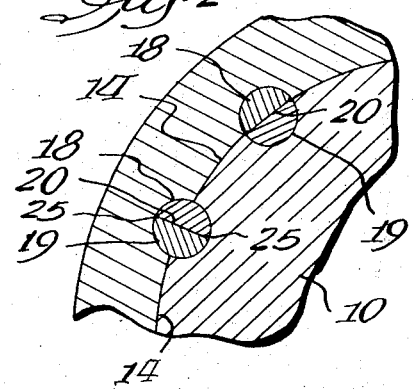
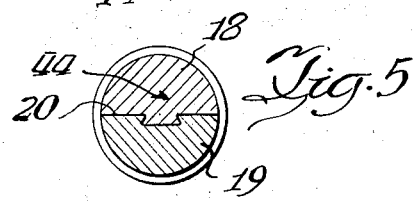
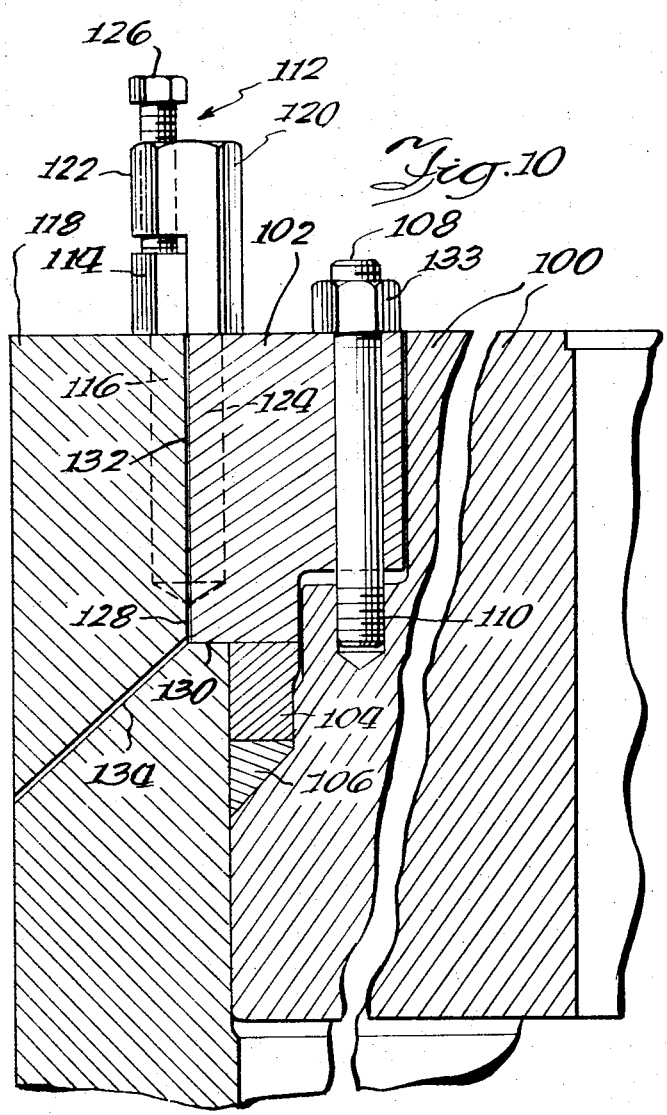
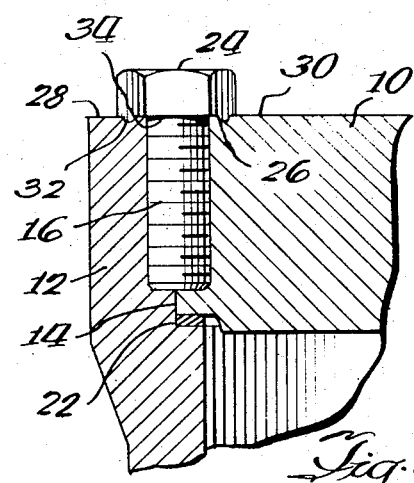
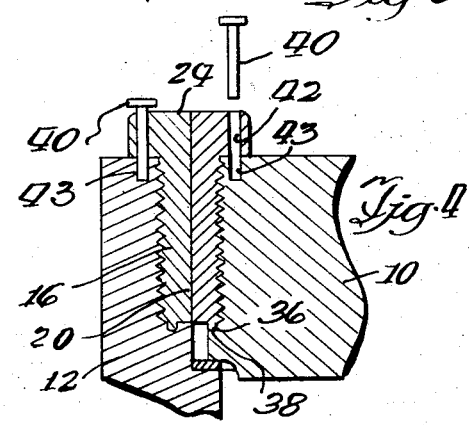
INVENTOR
Lyle V. Larsen
BY Merriam, Marshall, Shapiro & Klose
ATTORNEYS

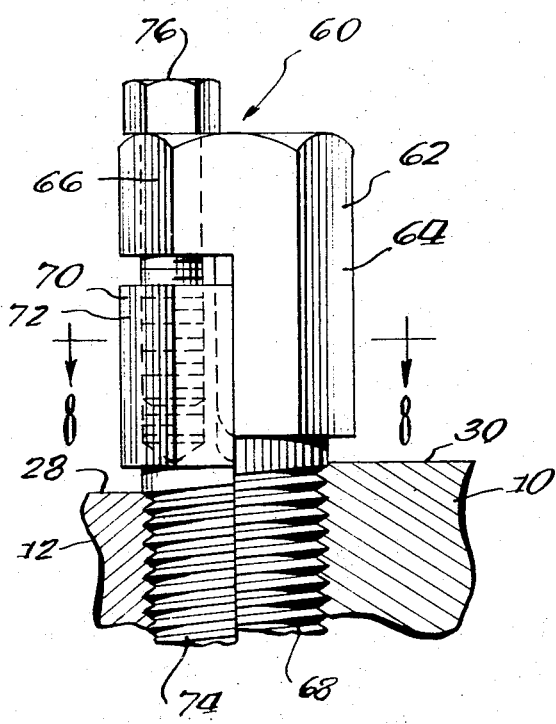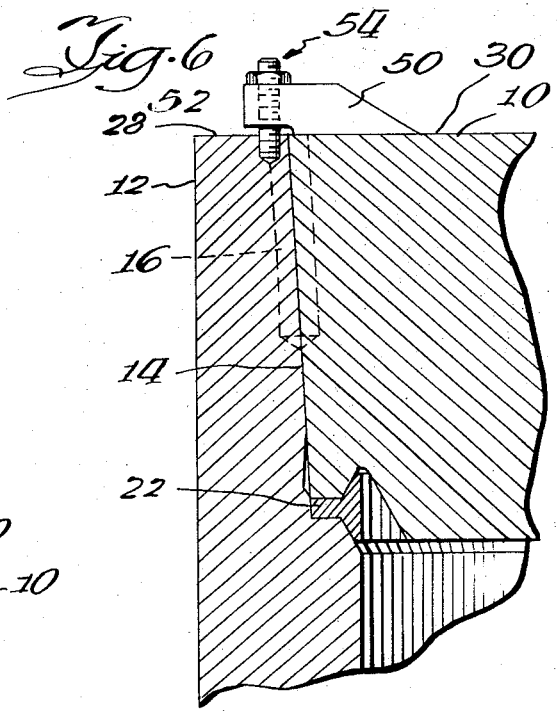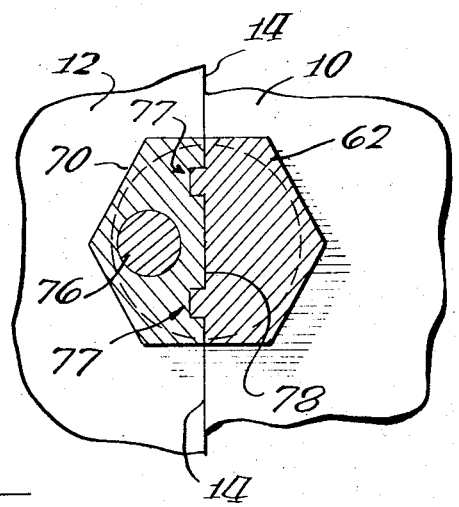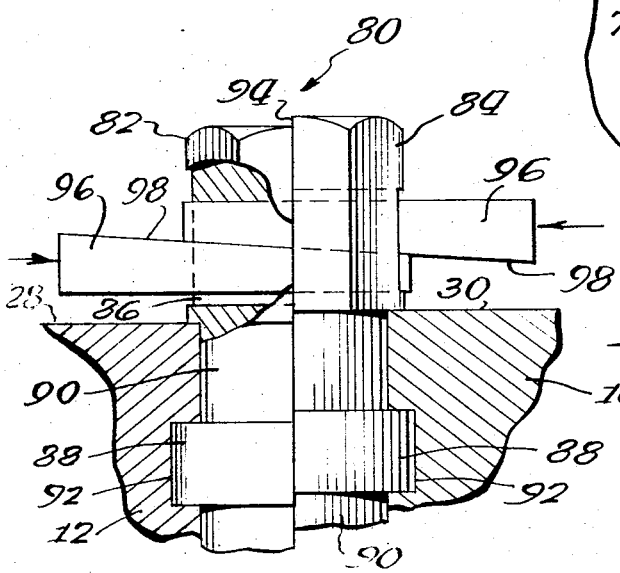

3,549,186

QUICK OPENING CLOSURE USING SPLIT SHEAR STUDS

BACKGROUND OF THE INVENTION

This invention relates to vessel closures, and in particular to improvements in fastening means for maintaining vessel covers in place.

Although the principles of the present invention are applicable to various types of vessel closures, particular advantages are afforded by utilizing the fastening means herein described for attaching the end plug used as the closure means in high pressure vessels. Reference may be had to U.S. Pat. Nos. 2,903,152 and 3,398,853, which illustrate the use of shear studs threadably engaging the pressure vessel wall and the end closure plug at the junction therebetween. In the normal use of the vessels for various processes, it is desired that the end closures be removable to permit maintenance and the replacement of process equipment within the vessel. However, the numerous closure means suggested in the prior art would require a long shutdown period in order to enable removal of the cover. Even the relatively simple shear stud type of closure shown in the patents listed above requires the unscrewing and removal of a great number of shear studs. Depending upon the diameter of the vessel involved, somewhere between 20 and 100 studs would have to be unscrewed from the perimeter of the vessel, involving a very lengthy and time consuming operation, during which period the process is shut down.

SUMMARY OF THE INVENTION

Therefore, in accordance with the principles of the present invention, there is provided a quick release closure means including an improved shear stud construction. In one aspect of this invention there is provided a quick release closure means for high pressure vessels, including a two-piece shear stud split along its longitudinal axis and in detachable engagement with the vessel and a closure plug. In this embodiment of the invention, the interface between the assembled shear stud halves is rotated transversely to the vessel-closure plug junction for locking the plug in place; and the interface is rotated in line with the vessel-plug junction for quick release of the plug from the vessel. The split shear stud threadably engages the plug and vessel, and the threads are placed in shear for locking the plug on the vessel. Thus, each stud need only be rotated 90° to enable releasing and withdrawal of the closure plug from the vessel. An alternative tongue and groove configuration is also illustrated. Guide means, such as a keyed section in the interface between stud halves can be provided to facilitate rotation and alignment of the stud halves.

In another aspect of this invention, there is provided fastening means including a split shear stud with a holddown bolt engaging both stud halves and enabling longitudinal displacement of the stud halves for the correct placement and engagement of a sealing gasket between the closure plug and the vessel.

BRIEF DESCRIPTION OF THE DRAWINGS

The invention will be better understood from the following detailed description thereof taken in conjunction with the accompanying drawings in which:

FIG. 1 is a fragmentary view partly in section illustrating the split shear studs constructed in accordance with the principles of the present invention and utilized in closure means for a high pressure vessel;

FIG. 2 is an enlarged fragmentary sectional view showing one shear stud in a locking engagement between the vessel and the closure plug, and another stud which has been rotated 90° in the unlocked position;

FIGS. 3 and 4 are sectional elevational views illustrating various retaining means for retaining the respective split stud halves to the vessel wall and to the closure plug;

FIG. 5 is a sectional view of a split stud having a guide key in accordance with another aspect of the present invention;

FIG. 6 illustrates a further embodiment of the invention incorporating a series of split studs and gasket clamping means for sealing the closure plug to the vessel wall;

FIGS. 7 and 8 illustrate an alternative split stud bolt-clamping and alignment means according to the present invention;

FIG. 9 illustrates another split stud bolt-clamping and alignment embodiment of the present invention; and FIG. 10 is a partial sectional view illustrating an alternative split stud embodiment enabling ready removal of the closure plug.

DESCRIPTION OF THE PREFERRED EMBODIMENTS

Referring now to FIGS. 1—5, there is illustrated the application of the present invention to provide quick release fastening means for attaching the closure plug 10 to one end of a high-pressure vessel 12. It is to be understood the improved fastening means have been illustrated herein in conjunction with closures for high-pressure vessels merely for purposes of setting forth an example of the invention, whereas the principles thereof can be readily applied to other structures where quick release fastening means are desired and would afford similar significant advantages over the prior art. Thus, in the present illustration, at the perimeter junction 14 between the outer diameter of the closure plug 10 and the inner diameter of the vessel wall 12, there is located a series of split studs 16 composed of separate half sections 18, 19 facing each other and defining an interface 20.

In the embodiment illustrated in FIGS. 1—5, each stud 16 threadably engages the closure plug 10 and vessel wall 12. To lock the plug to the vessel the series of studs 16 are threaded in until the interface 20 is aligned transversely with the perimeter junction 14 so as to place the threads in shear during normal operation of the vessel. The position of the studs 16 when the end plug 10 is locked in position is illustrated in FIG. 1. In this position, the plug 10 is maintained in sealing engagement with sealing means 22.

Removal of the locking engagement can be readily provided by simply rotating the stud head 24 until interface 20 is aligned with the perimeter junction 14. The closure plug 10 can thereafter be lifted off of the vessel 12 with one-half of the stud remaining in the vessel and the other half of the split stud remaining in the vessel and the closure plug. For instance, as is shown in FIG. 2, the stud 16 has been rotated so as to place interface 20 in line with perimeter junction 14. Thus, split stud half section 18 remains in the vessel 12, whereas split stud half section 19 is removed with the closure plug. Opposite interface edges 25 are preferably rounded off to permit the half sections 18, 19 to rotate smoothly within the vessel-plug junction.

FIGS. 3 and 4 illustrate various retaining means which can be utilized for retaining the respective split stud half sections in the vessel and plug during the removal operation. As shown in FIG. 3, an annular groove 26 is provided on the top surface 28 of the vessel and on the top surface 30 of the plug. A matching protruding lip 32 on the underface 34 slidably engages the groove 26 when the stud 16 is in the fully threaded-in position. As can be seen from FIG. 4, a similar projecting lip 36 at the opposite stud end and groove 38 in the vessel and plug are provided to maintain the opposite stud end in longitudinal position. Therefore, as the closure plug 10 is lifted off the vessel, the illustrated matching projecting lips and grooves at each stud end retain the respective stud halves in position.

FIG. 4 illustrates an alternative embodiment wherein a retaining pin 40 passes through holes 42 in the stud head 24 on each stud half section to detachably engage suitable cavities 43 in the closure plug 10 and the vessel 12. Thus, in this embodiment of the invention after the stud 16 has been rotated to the unlocked position, the retaining pins 40 are inserted into the respective stud halves to enable the half sections to be maintained in position during removal of the closure plug 10.

FIG. 5 illustrates a keying section 44 in the interface 20 between the respective stud half sections. The keying section 44 more securely locks the half sections in position during rotation of the stud 16. Such a keyed section can be provided by a protrusion on one stud half section and a matching groove on the other half section longitudinally along the stud interface 20 in the shape of the illustrated cross-sectional view of FIG. 5.

Replacement of the plug 10 on the vessel is accomplished by initially aligning the stud half sections and the respective interfaces along the perimeter junction 14. The plug 10 is then lowered vertically into position, and the split studs are aligned in vertical position as illustrated in FIGS. 3 and 4, with the studs each rotated 90° to place the interface 20 transverse to the perimeter 14, thereby locking the plug into position.

The sectional view of FIG. 6 illustrates another embodiment of the present invention wherein a series of split shear studs 16 as previously described are located around the perimeter junction 14 as illustrated in FIG. 1. In the embodiment shown in FIG. 6, a suitable number of brackets 50 are mounted to the top surface 30 of the closure plug 10. The brackets 50 include a portion 52 overhanging the top surface 28 of the vessel wall 12. A threaded nut and bolt means 54 threadably engages the overhanging portion 52 and the vessel wall 12 so as to initially position the closure plug against the gasket sealing means 22 to insure a leakproof seal during operation of the high-pressure vessel. Note that the quick release capability of the present invention would still be maintained since once the bolt and nut means 54 have been detached from vessel 12, the studs 16 still need only be rotated 90° in order to remove the plug from the vessel. For ease in removing and replacing the cover 10, the perimeter junction 14 is preferably slightly tapered as illustrated in FIG. 6.

FIGS. 7 and 8 illustrate still another embodiment of the present invention wherein the split shear stud 60 includes a first half section 62 having a hexagonal top 64 having an overhang portion 66 extending over the top vessel surface 28. Extending from the stud half 64 is a threaded portion 68. The other stud half 70 contains a portion 72 and a threaded section 74. As can be seen from FIG. 7, the stud half section 70 is located below the overhang portion 66 of the other half section 62. A bolt 76 passes through a suitable aperture in portion 66 to threadably engage the head portion 72 to enable longitudinal alignment of the half sections 62 and 70 and top vessel surface 28 with the top plug surface 30. The sectional view of FIG. 8 illustrates a double keyed section 77 in the stud interface 78 to insure reliable locking together of the stud half sections during the stud rotation.

Referring now to FIG. 9, there is illustrated a still further example of the present invention wherein there is illustrated a split stud 80 having half sections 82 and 84 each with a slotted portion 86. Instead of a threaded member as previously illustrated, the stud 80 shown in FIG. 9 includes a series of projecting tongues 88 along the shank portion 90 of each stud half which function has horizontal shear members. The vessel 12 and closure plug 10 include matching grooves 92 for receiving the projecting tongues 98 when the respective stud halves are inserted therein. The stud halves are then aligned so that the stud interface 94 is in line with the perimeter junction 14 and the closure plug 10 may then be placed in position on the vessel with the bottom portion of the closure plug depressingly engaging the gasket sealing means 22. A pair of wedge members 96 each having slanted faces 98 are inserted into the slotted portion 86 in each stud half as shown in FIG. 9. The wedges 96 are each urged in opposite directions through the slotted portion to exert pressure on the stud half 84 thereby lowering the closure plug 10 onto the sealing means until the top vessel surface 28 is aligned with the top closure plug surface 30.

FIG. 10 illustrates the application of the split shear stud principle of the present invention to a type of closure known as the Bridgman closure using shear studs. As illustrated in FIG. 10, a closure plug 100 includes annular retainer ring 102, a follower ring 104, and a gasket 106. A series of pullup studs 108 are inserted through suitable apertures in retainer ring 102 so as to threadably engage the closure plug and threaded section 110.

A split shear stud 112 formed similar to the stud 60 of FIG. 7, includes stud half 114 having threads or other horizontal shearing members on shank portion 116 engaging the vessel 118. The other stud half 120 includes an overhang portion 122 overlying the stud half 114, and further includes a half shank portion 124 similar in shape to the adjacent half shank portion 116. A bolt 126 threadably engages the overhang portion 122 and bears against the stud half 114.

In operation, the split stud half 114 is inserted and retained by suitable retaining means in the vessel 118; and the other split stud half 120 is similarly retained in retainer ring 102. Only one split stud is shown in FIG. 10, it being understood that a series of such studs are located around the vessel at the junction 128 between the vessel and the retainer ring. The entire closure means including the closure plug 100, retainer ring 102 with stud half 120, follower ring 104, and gasket 106 is lowered into the vessel until the retainer ring rests on the shoulder 130 of the vessel. There would be no resistance to this placement so no auxiliary means would be required to align the threads in the stud bolt. The split shear studs 112 would then be rotated into the locking position with interface 132 transverse to the junction 128.

After all of the split shear studs have been rotated into the locking position, the gasket 106 would be forced out against the inner wall of vessel 18 for an initial sealing by means of the pullup studs 108. This is to prevent leakage during pressurization of the vessel. After pressurization, the entire pressure load from the closure plug 100 is carried through the gasket 106, through the follower ring 104, and into the retainer ring 102 which is held in place by means of the split shear studs 112. The clearance between the closure plug 100 and the retainer ring 102 at the pullup studs 108 is sufficient so the closure plug never bears directly on the retainer ring.

In the normal Bridgman closure using standard shear studs, the gasket 106 is squeezed so hard between the closure plug 100 and the vessel wall that even after removal of the shear studs, elaborate means must be provided to jack the retainer ring 102 and closure plug 100 up and out of the vessel 118. However, in accordance with the principles of the present invention, such removal of the closure plug from the vessel under these circumstances can be readily accomplished using the split shear stud 112.

In the removal operation, all of the split shear studs 112 are rotated so that the interfaces 132 are in the nonlocking alignment with junction 128. Nuts 133 of pullup studs 108 are rotated to relax pressure on gasket 106. Bolt 126 is then rotated to move split stud half 120 farther away from the half 114 and thereby raise the entire closure plug assembly up to free the gasket from the vessel.

A bead of calking compound can be placed at the top of the vessel and at the junction between vessel 118 and retainer ring 102 so as to prevent moisture and debris from entering the junction. A small three-eighths inch diameter drain hole 134 is drilled through the vessel wall to the base of the retainer ring on a slight downward direction as illustrated in FIG. 10, so as to drain any accumulated moisture in the junction. Similar calking and drain hole arrangements can be suitably provided with the closure means previously illustrated.

The foregoing detailed description has been given for clearness of understanding only and no unnecessary limitations should be understood therefrom, as modifications will be obvious to those skilled in the art.

I claim:

1. Quick release fastening means for detachably fastening two adjacent members along a common joint, said fastening means comprising:
   a multisection shear stud having at least two separable, longitudinal sections, said sections adjacently disposable in abutting relationship to define an interface therebetween extending along the length of said stud sections;
   said stud sections being insertable in said members on each side of said common joint; and
   said stud rotatable from a locking position to an unlocked position, said stud in the unlocked position enabling slidable displacement of one stud section with respect to the other stud section for detaching and separating said members.

2. Quick release fastening means as claimed in claim 1, wherein said stud is rotatable from said locking position with said interface transverse to said common joint for fastening said members together with shear forces along the length of said stud sections at said common joints to said unlocked position with said interface substantially aligned with said joint.

3. Quick release closure means for detachably connecting an end closure plug to a vessel along a common joint, said closure means comprising: a plurality of multisection shear studs for engagement along said common joint, each having two separable half sections disposable in abutting relationship to define an interface therebetween; and means enabling rotation of said studs from a locking position maintaining said end closure plug on said vessel by shear forces acting along the length of said stud sections to an unlocked position enabling slidable displacement of one stud half section with respect to the other stud half section along said interfaces for detaching and separating said end closure plug from said vessel.

4. Quick release closure means as claimed in claim 3, wherein said studs are rotatable from said locking positions with said interfaces transverse to said common joint to said unlocked position with said interfaces substantially aligned with said common joint.

5. Quick release closure means as claimed in claim 3, including retaining means for retaining a plurality of said stud half sections in said end closure plug disposed along one side of said common joint and for retaining the remainder of said stud half sections in said vessel disposed along the other side of said common joint.

6. Quick release closure means as claimed in claim 5, wherein said retaining means comprises ridge means on said stud sections captured within mating grooves on said vessel to maintain said respective half sections captured within said plug and vessel during removal of said plug.

7. Quick release closure means as claimed in claim 3, wherein said shear stud half sections threadably engage said closure plug and vessel along said common joint.

8. Quick release closure means as claimed in claim 3, including matching tongue and groove means on said stud half sections, said plug, and said vessel for retaining said stud half sections in position and enabling rotation of said studs with respect to said plug and vessel.

9. Quick release closure means as claimed in claim 3, including keying means with said interface keying said stud half sections during rotation thereof.

10. Quick release closure means as claimed in claim 3, including adjusting means interconnecting said stud half sections for adjusting the longitudinal displacement of said half sections along said interface to align said half sections and thereby sealingly secure said end plug on said vessel.

11. Quick release closure means as claimed in claim 10, wherein said adjusting means comprises a threaded bolt.

12. Quick release closure means as claimed in claim 10, wherein said adjusting means comprises wedge means including a pair of wedges within said studs.

13. In high-pressure vessels having an end closure plug and a plurality of shear studs for mounting said plug to said vessel along a common junction, the improvement comprising:
said shear studs including separable half sections adjacently disposed in abutting relationship to define an interface;
said interface located transverse to said junction to lock said plug to said vessel by shear forces acting along the length of said stud; and
said interface located aligned with said junction to unlock said plug and enable removal from said vessel by slidably displacing said stud half sections along said interface.